(12) United States Patent
Putro

(10) Patent No.: US 9,807,428 B2
(45) Date of Patent: Oct. 31, 2017

(54) VIDEO DISTRIBUTION SERVER AND SSD CONTROL METHOD

(71) Applicant: Kabushiki Kaisha Toshiba, Minato-ku, Tokyo (JP)

(72) Inventor: Dimas Rinarso Putro, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 33 days.

(21) Appl. No.: 14/481,728

(22) Filed: Sep. 9, 2014

(65) Prior Publication Data

US 2014/0379971 A1    Dec. 25, 2014

Related U.S. Application Data

(63) Continuation of application No. PCT/JP2013/050833, filed on Jan. 17, 2013.

(30) Foreign Application Priority Data

Mar. 15, 2012    (JP) ................................ 2012-058494

(51) Int. Cl.
*H04N 21/218*    (2011.01)
*H04N 21/231*    (2011.01)
*H04N 21/24*    (2011.01)
*G06F 3/06*    (2006.01)
*G06F 11/10*    (2006.01)
*G06F 12/02*    (2006.01)
(Continued)

(52) U.S. Cl.
CPC ....... *H04N 21/2182* (2013.01); *G06F 3/0616* (2013.01); *G06F 3/0659* (2013.01); *G06F 3/0688* (2013.01); *G06F 11/108* (2013.01); *G06F 12/0246* (2013.01); *G06F 15/17331* (2013.01); *H04L 67/1097* (2013.01); *H04N 21/231* (2013.01); *H04N 21/23103* (2013.01); *H04N 21/23113* (2013.01); *H04N 21/2404* (2013.01); *G06F 2211/1016* (2013.01); *G06F 2212/7211* (2013.01)

(58) Field of Classification Search
None
See application file for complete search history.

(56) References Cited

U.S. PATENT DOCUMENTS

| 8,214,583 | B2 | 7/2012 | Sinclair et al. |
| 2006/0184718 | A1 | 8/2006 | Sinclair et al. |
| 2006/0184723 | A1 | 8/2006 | Sinclair et al. |

(Continued)

FOREIGN PATENT DOCUMENTS

| JP | H10-222317 A1 | 8/1998 |
| JP | 2008-530709 A | 8/2008 |

(Continued)

OTHER PUBLICATIONS

International Search Report issued by Japan Patent Office on Apr. 2, 2013 in PCT application No. PCT/JP2013/050833—9 pages.

*Primary Examiner* — Midys Rojas
(74) *Attorney, Agent, or Firm* — Knobbe, Martens, Olson & Bear LLP

(57) ABSTRACT

According to one embodiment, a video distribution server includes an SSD and an SSD operator. The SSD includes a storage medium and a controller. The controller executes a wear leveling process on the storage medium. The SSD operator gives the controller an instruction to disable a wear leveling function. The wear leveling function provides the wear leveling process.

16 Claims, 10 Drawing Sheets

(51) Int. Cl.
    *G06F 15/173*     (2006.01)
    *H04L 29/08*     (2006.01)

(56) References Cited

U.S. PATENT DOCUMENTS

2009/0228641 A1    9/2009    Kurashige
2010/0223423 A1    9/2010    Sinclair et al.

FOREIGN PATENT DOCUMENTS

| JP | 2010-513993 A | 4/2010 |
| JP | 2011-061720 A | 3/2011 |
| WO | WO 2006/088723 A2 | 8/2006 |
| WO | WO 2009/110141 A1 | 9/2009 |

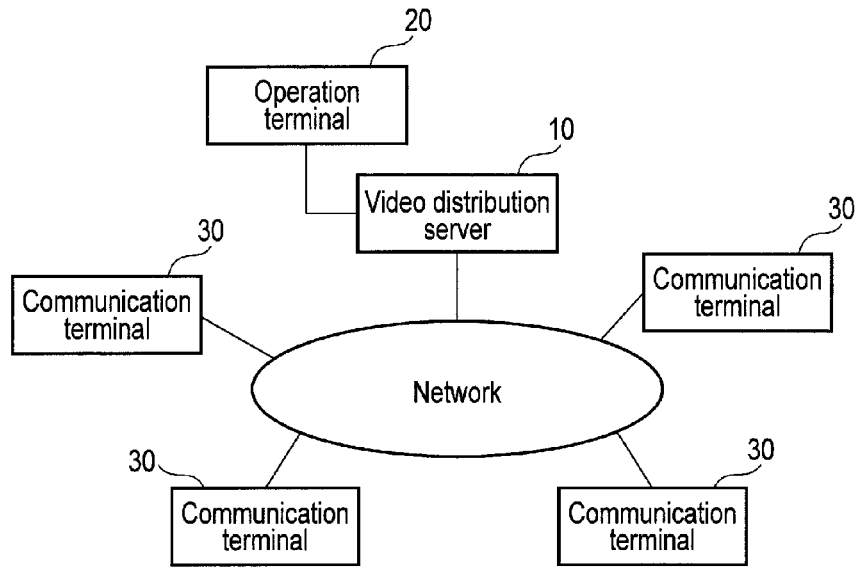
F I G. 1
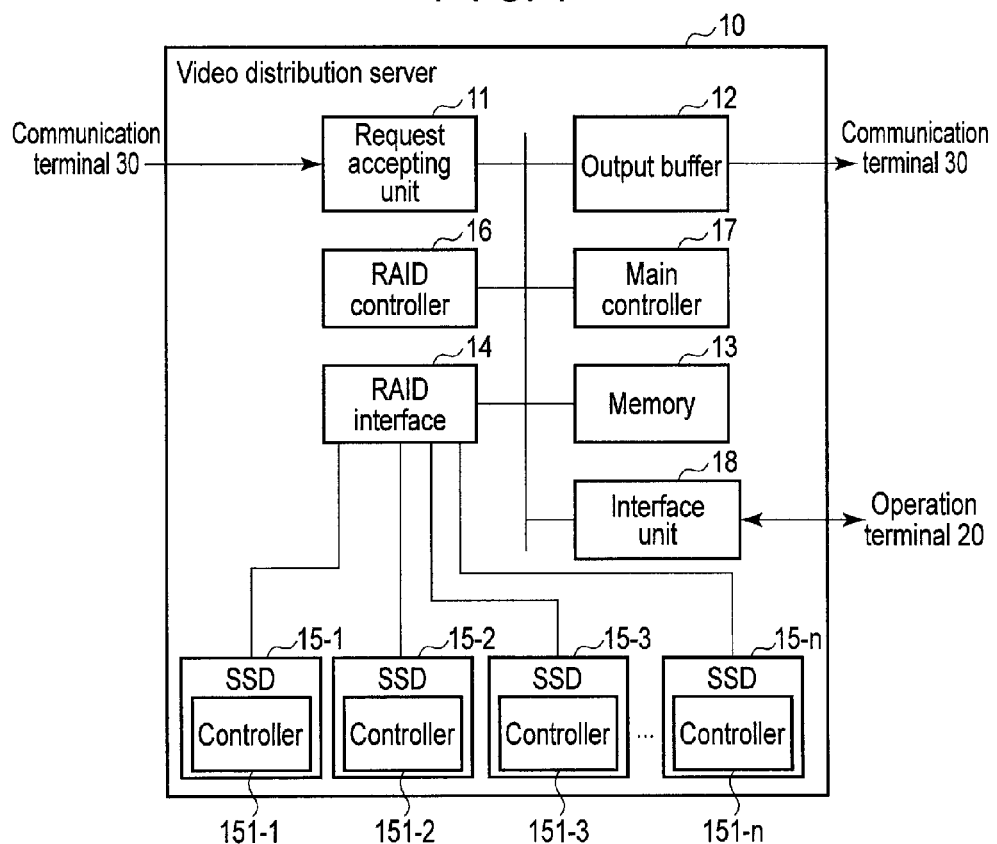
F I G. 2

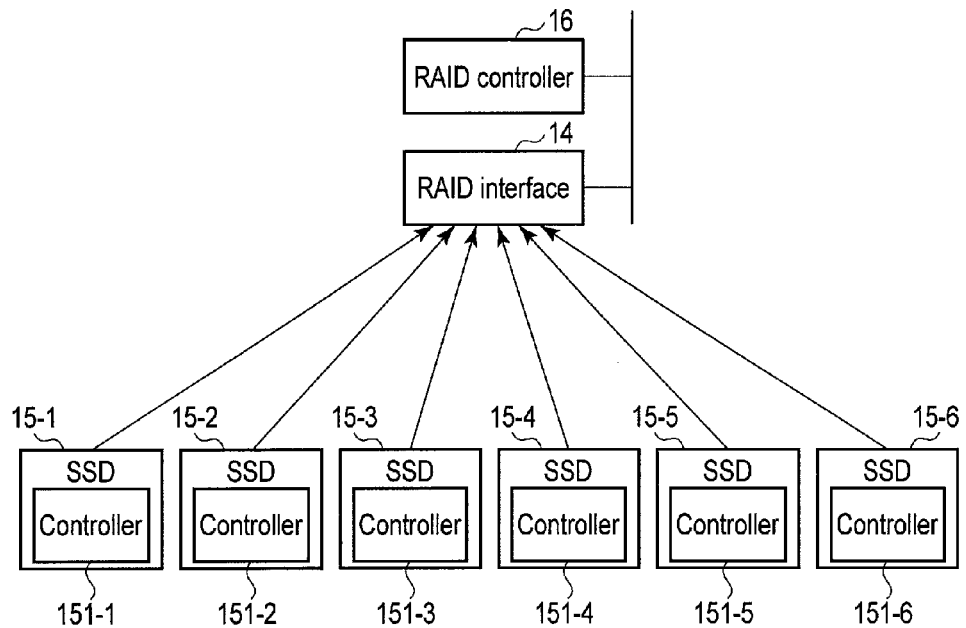
F I G. 6
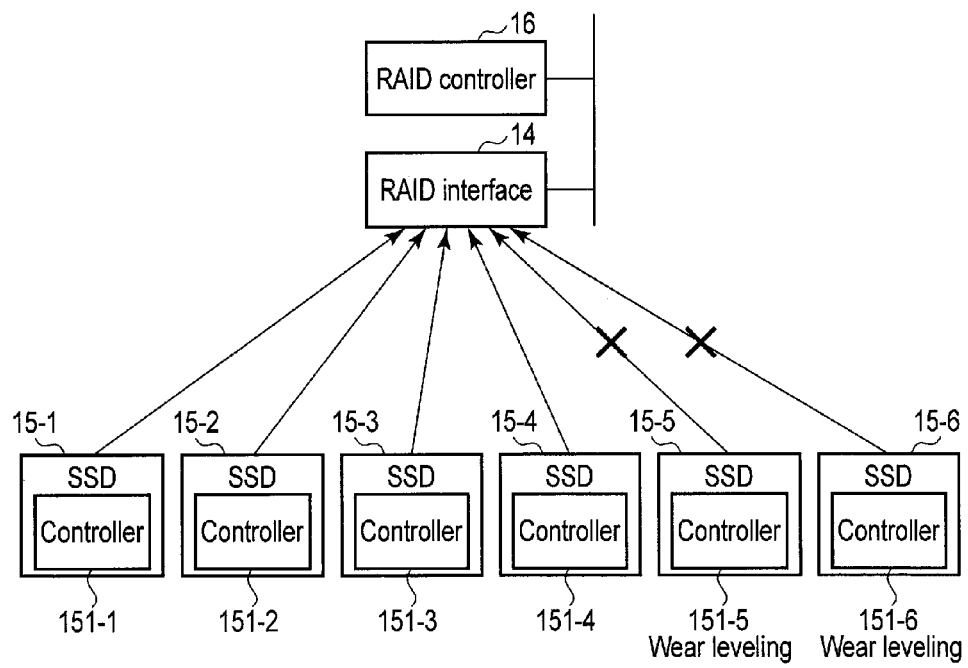
F I G. 7

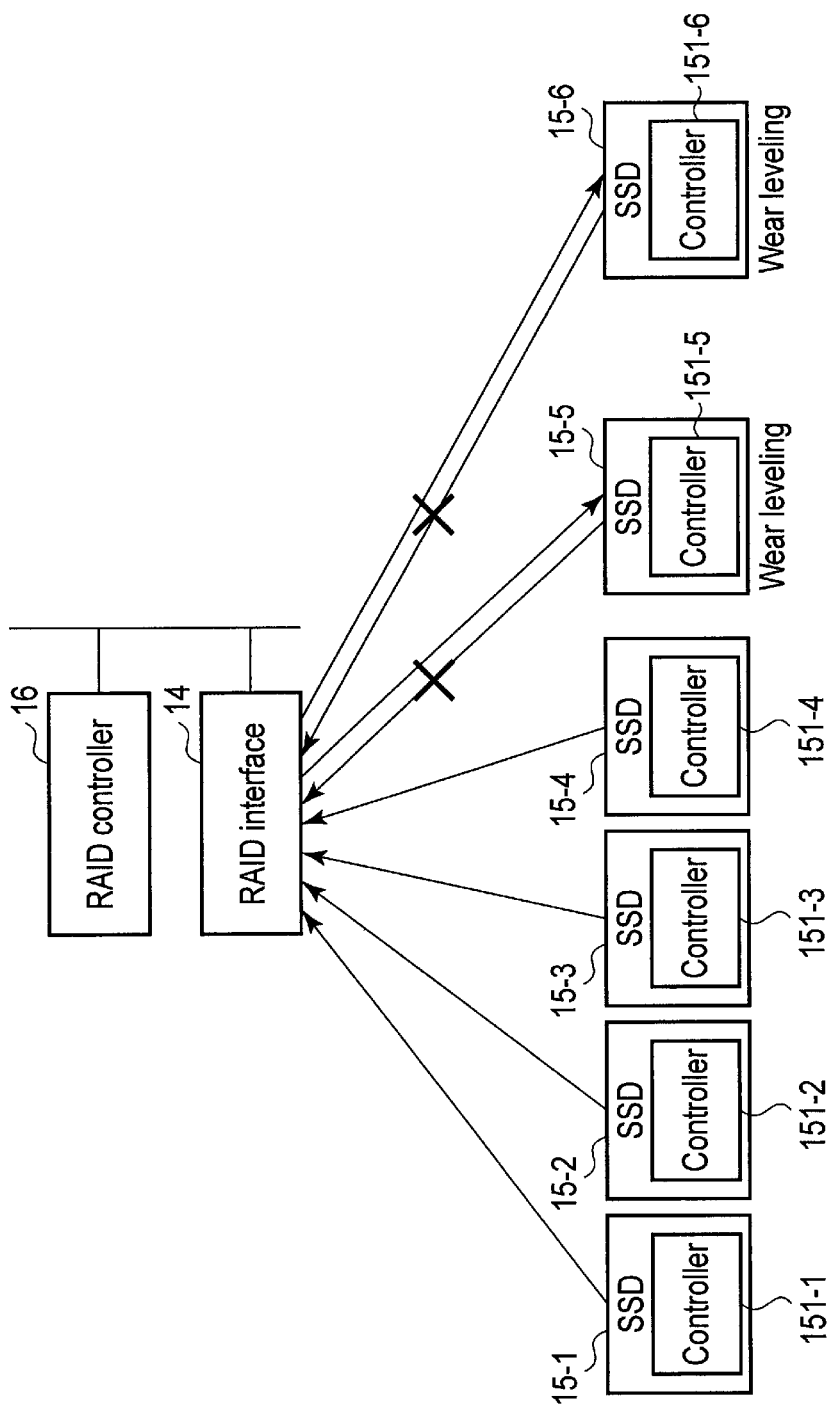
F I G. 10

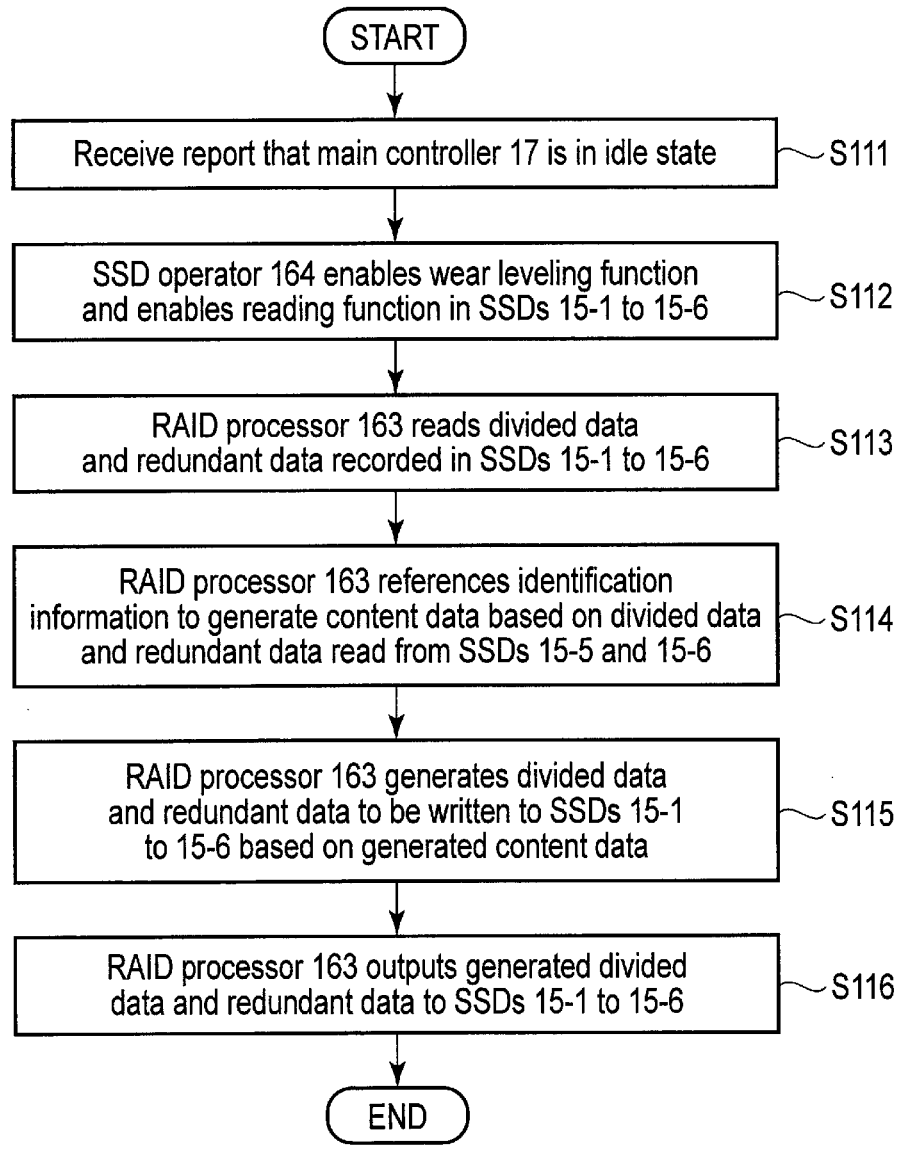
F I G. 11

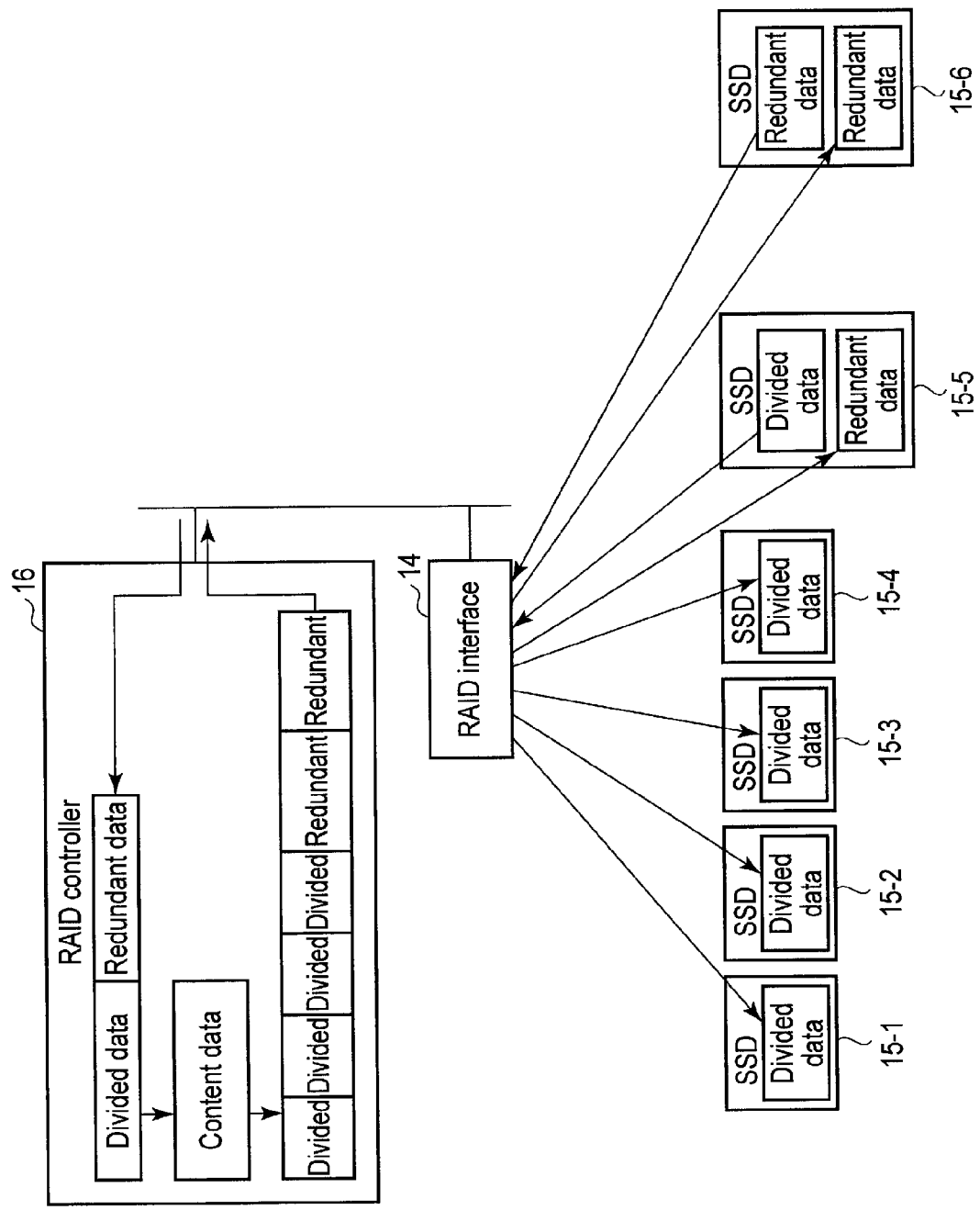
F I G. 12

VIDEO DISTRIBUTION SERVER AND SSD CONTROL METHOD

CROSS-REFERENCE TO RELATED APPLICATIONS

This application is based upon and claims the benefit of priority from prior Japanese Patent Application No. 2012-058494, filed Mar. 15, 2012, the entire contents of which are incorporated herein by reference.

FIELD

The present embodiment relates to a video distribution server that stores data in an SSD (Solid State Drive) and an SSD control method used in the video distribution server.

BACKGROUND

In recent years, a video distribution server that records contents in an SSD has been proposed. The SSD requires neither a time for moving a read device on a disk nor a time necessary for an area recording desired data to rotate to the read device, and hence is capable of read and write faster than a Hard Disk Drive (HDD). Thus, the video distribution server with the SSD can respond quickly to simultaneous accesses from a plurality of clients.

When data are written to an SSD or at a predetermined timing, a process referred to as wear leveling may be executed. The wear leveling is a process for distributing writing over a plurality of elements in one storage medium as evenly as possible instead of concentrating the writing on one element in the storage medium. A storage medium using an SSD is limited in the number of writing operations, and thus, the wear leveling enables the life of the storage medium with the SSD to be extended.

However, disadvantageously, when wear leveling is performed on an SSD while content data are being read from the same SSD, the reading process is suspended, reducing a speed at which contents are read from the SSD.

BRIEF DESCRIPTION OF THE DRAWINGS

FIG. 1 is a block diagram showing a functional configuration of a network system to which a video distribution server according to the present embodiment is connected.

FIG. 2 is a block diagram showing a functional configuration of a video distribution server shown in FIG. 1.

FIG. 6 is a diagram showing that the divided data and redundant data are read from the SSDs shown in FIG. 2.

FIG. 7 is a diagram showing that the divided data and/or redundant data are read from some of the SSDs shown in FIG. 2.

FIG. 10 is a diagram showing that the divided data and/or redundant data are read from some of the SSDs shown in FIG. 2 and where divided data and redundant data are written to the other SSDs.

FIG. 11 is a flowchart showing an operation performed by the RAID controller shown in FIG. 2 in an idle state.

FIG. 12 is a diagram showing that the content data written to some of the SSDs shown in FIG. 2 is reconstructed into a striped structure.

DETAILED DESCRIPTION

Figure 3:
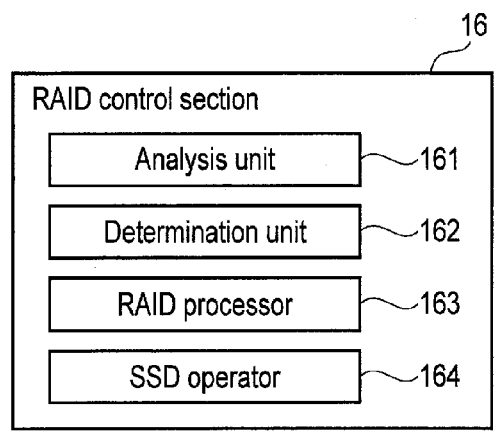
FIG. 3 is a block diagram showing a functional configuration of a RAID controller shown in FIG. 2.

In general, according to one embodiment, a video distribution server includes an SSD and an SSD operator. The SSD includes a storage medium and a controller. The controller executes a wear leveling process on the storage medium. The SSD operator gives the controller an instruction to disable a wear leveling function. The wear leveling function provides the wear leveling process.

An embodiment will be described with reference to the drawings.

FIG. 1 is a block diagram showing a functional configuration of a network system to which a video distribution server 10 according to the embodiment is connected. The network system comprises the video distribution server 10, an operation terminal 20, and a plurality of communication terminals 30, for example, PCs, smartphones, and cellular phones. The video distribution server 10 connects to the operation terminal 20, for example, via a LAN cable. Furthermore, the video distribution server 10 connects to the communication terminals 30 via a network.

The video distribution server 10 distributes a content recorded in the video distribution server 10 to the communication terminal 30 using a pre-downloading method, a streaming method, or the like, in accordance with an access request from the communication terminal 30. The distribution of contents is performed using various distribution protocols such as an HTTP distribution protocol.

The video distribution server 10 records a new content supplied from the operation terminal 20 in accordance with a write request from the operation terminal 20. Furthermore, the video distribution server 10 replaces the new content supplied from the operation terminal 20 with a previously recorded content.

FIG. 2 is a block diagram showing a functional configuration of the video distribution server 10 according to the embodiment. The video distribution server 10 shown in FIG. 2 comprises a request accepting unit 11, an output buffer 12, a memory 13, a RAID interface 14, SSDs (Solid State Drives) 15-1 to 15-$n$, a RAID controller 16, a main controller 17, and an interface unit 18. The request accepting unit 11, the output buffer 12, the memory 13, the RAID interface 14, the RAID controller 16, the main controller 17, and the interface unit 18 are connected together by a bus.

The request accepting unit 11 accepts an access request transmitted across the network from the communication terminal 30. The request accepting unit 11 outputs the accepted access request to the main controller 17.

The interface unit 18 receives a write request supplied from the operation terminal 20 and content data supplied from the operation terminal 20. The interface unit 18 outputs the received write request to the main controller 17 and outputs the content data to the RAID controller 16.

The main controller 17 comprises, for example, a CPU (Central Processing Unit) and controls operations of the video distribution server 10 by driving the CPU using programs and data recorded in the memory 13.

Upon receiving an access request from the request accepting unit 11, the main controller 17 starts establishing a session with the communication terminal having transmitted the access request. The main controller 17 outputs a session establishment request to the output buffer 12. Upon establishing the session, the main controller 17 reports to the RAID controller 16 that the session has been established. Upon establishing the session, the main controller 17 outputs a read request to the RAID controller 16 to allow the RAID controller 16 to read contents from the SSDs 15-1 to 15-*n*. Furthermore, upon receiving a write request from the interface unit 18, the main controller 17 requests the RAID controller 16 to report on the amount of free space of the SSDs specified by the RAID controller 16. The main controller 17 determines whether or not the amount of free space in the SSDs is larger than a predetermined amount.

When writing to the SSDs is possible, the main controller 17 outputs a write request to the RAID controller 16. When writing to the SSDs is impossible, the main controller 17 outputs an error message to the operation terminal 20 via the interface unit 18.

For example, when maintenance work or the like is performed, the video distribution server 10 is in an idle state where various operations of the video distribution server 10 are limited. When the video distribution server 10 is in the idle state, the main controller 17 reports to the RAID controller 16 that the video distribution server 10 is in the idle state.

The RAID interface 14 is an interface between the bus and the SSDs 15-1 to 15-*n*. Signals transmitted through the bus are supplied to the SSDs 15-1 to 15-*n* via the RAID interface 14. Signals output by the SSDs 15-1 to 15-*n* are supplied to the bus via the RAID interface 14.

The RAID controller 16 is, for example, firmware comprising a Field Programmable Gate Array (FPGA) and comprises the functions of an analysis unit 161, a determination unit 162, a RAID processor 163, and an SSD operator 164, as shown in FIG. 3.

Upon receiving the report that a session has been established, the analysis unit 161 counts the number of established sessions. Based on the counted number of sessions, the analysis unit 161 analyzes the number of sessions during a preset time. The analysis unit 161 reports the result of the analysis to the determination unit 162.

Based on the analysis result from the analysis unit 161, the determination unit 162 determines the state of accesses made at the current time. The determination may be made each time an analysis result is received or at a predetermined period. The determination unit 162 outputs the result of the determination to the RAID processor 163 and the SSD operator 164.

For example, when the number of sessions during the preset time is larger than a preset reference value, the determination unit 162 determines the access state to be a "large-number client state". When the number of sessions during the preset time is smaller than the preset reference value, the determination unit 162 determines the access state to be a "small-number client state". Specifically, the determination unit 162 determines a state with 4,000 sessions or more per hour to be the "large-number client state" and determines a state with less than 4,000 sessions per hour to be the "small-number client state".

In accordance with the access state determined by the determination unit 162, the SSD operator 164 selects those of the controllers 152-1 to 152-*n* mounted in the SSDs 15-1 to 15-*n*, respectively, for which a wear leveling function is enabled, whereas a reading function is disabled, and those of the controllers 152-1 to 152-*n* for which the wear leveling function is disabled, whereas the reading function is enabled. The reading function refers to a function provided by the controllers 151-1 to 151-*n* to read data from the storage media 151-1 to 151-*n*. Based on the selection, the SSD operator 164 gives the controllers 151-1 to 151-*n* an instruction to enable the wear leveling function and to disable the reading function and an instruction to disable the wear leveling function and to enable the reading function.

For example, when the access state is the large-number client state, the SSD operator 164 gives the controllers 152-1 to 152-*n* an instruction to disable the wear leveling function and to enable the reading function. Furthermore, in the small-number client state, when the number of sessions is between 2,000 and 3,999, the SSD operator 164 gives an instruction to disable the wear leveling function and to enable the reading function for x of the controllers 152-1 to 152-*n*, and gives an instruction to enable the wear leveling function while disabling the reading function for the n-x controllers. Furthermore, in the small-number client state, when the number of sessions is between 1,000 and 1,999, the SSD operator 164 gives an instruction to disable the wear leveling function and to enable the reading function for y of the controllers 152-1 to 152-*n*, and gives an instruction to enable the wear leveling function and to disable the reading function for the n-y controllers. Additionally, in the small-number client state, when the number of sessions is between 0 and 999, the SSD operator 164 gives an instruction to disable the wear leveling function and to enable the reading function for z of the controllers 152-1 to 152-*n*, and gives an instruction to enable the wear leveling function and to disable the reading function for the n-z controllers. In this case, x, y, and z are the numbers of controllers at which the RAID processor 163 can restore the content data based on data read from the SSDs, and x>y>z.

Upon receiving the report from the main controller 17 that the video distribution server 10 is in the idle state, the SSD operator 164 gives the controllers 151-1 to 151-*n* an instruction to enable the wear leveling function and to disable the reading function.

The RAID processor 163 is requested by the main controller 17 to report on the amount of free space. The request from the main controller 17 for the report of the amount of free space targets those of the SSDs 15-1 to 15-*n* for which the reading function is disabled. The RAID processor 163 reports to the main controller 17 the amount of free space in the SSDs for which the reading function is disabled.

In accordance with a write request, the RAID processor 163 gives the SSDs an instruction to perform writing of supplied content data using the RAID scheme. At this time, targets for the writing are those of the SSDs 15-1 to 15-*n* for which the reading function is disabled. Specifically, the RAID processor 163 divides the supplied content data into a predetermined number of divided data. The RAID processor 163 generates redundant data intended to restore one of the plurality of divided data. At this time, the divided data into which the same content data has been divided are provided with identification information indicating that the divided data or the redundant data are based on the same content data. The RAID processor 163 outputs the divided data and the redundant data to the write target SSDs. The RAID processor 163 repeatedly executes the above-described process on the supplied content data. The RAID processor 163 appropriately switches the destinations of the divided data and redundant data in order to avoid fixing the SSDs in which the redundant data are recorded.

Figure 4:
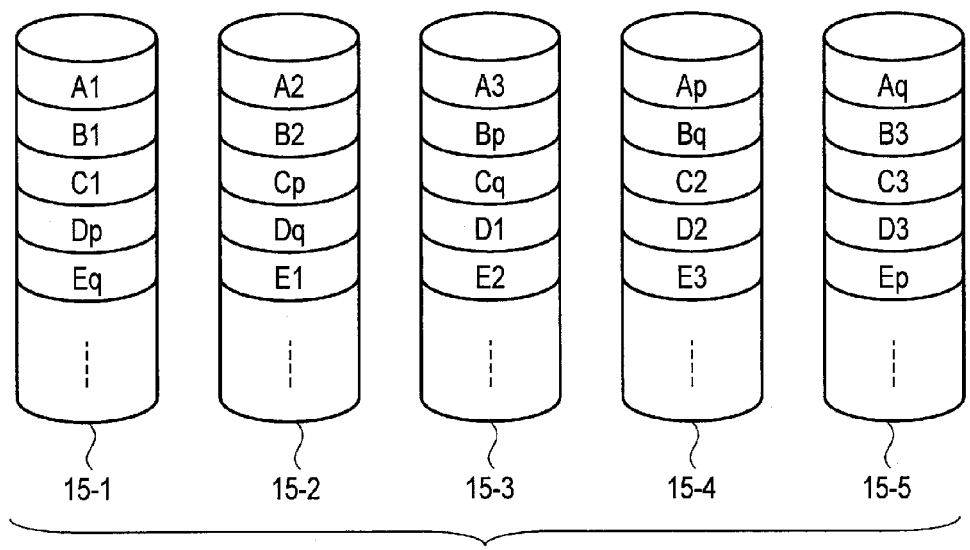
FIG. 4 is a diagram showing data recorded in SSDs shown in FIG. 2.

The numbers of divided data and redundant data generated vary in accordance with the number of write target SSDs and the level of the RAID system. FIG. 4 is a schematic diagram showing an example of data recorded in the SSDs 15-1 to 15-5 when five SSDs are write targets and the RAID system is at the level 6. In FIG. 4, data A1 to A3, data B1 to B3, data C1 to C3, data D1 to D3, and data E1 to E3 are divided data. Data Ap, Bp, Cp, Dp, and Ep are parity data that are first redundant data. Data Aq, Bq, Cq, Dq, and Eq are second redundant data. The second redundant data may be parity data generated based on data with different addresses or data resulting from multiplication by different coefficients. Thus, the content data are accumulated in the SSDs 15-1 to 15-5 so as to have a striped structure.

In accordance with a read request, the RAID processor 163 gives an instruction to read the divided data and the redundant data into the SSDs with the reading function enabled therein. The RAID processor 163 generates content data using the RAID scheme based on the divided data and redundant data read from the SSDs with the reading function enabled therein. That is, if any of the divided data read in parallel from the SSDs with the reading function enabled therein includes an error or is missing, the RAID processor 163 restores the erro data or the missing divided data from the other divided data and redundant data. The RAID processor 163 generates content data by coupling the other divided data to the restored divided data. The RAID processor 163 outputs the generated content data to the output buffer 12. The RAID processor 163 sequentially reads the divided data and the redundant data from the SSDs 15-1 to 15-*n* in parallel and generates content data based on the read divided data and redundant data.

Upon receiving the report from the main controller 17 that the video distribution server 10 is in the idle state, the RAID processor 163 reconstructs the RAID configuration of the content data recorded in at least any of the SSDs 15-1 to 15-*n* as the divided data and the redundant data, into a RAID configuration supported by the video distribution server 10. That is, the RAID processor 163 reads the divided data and redundant data recorded in at least any of the SSDs 15-1 to 15-*n*. The RAID processor 163 generates content data based on those of the read divided data and redundant data which are provided with the same identification information. Based on the generated content data, the RAID processor 163 generates divided data and redundant data to be written to the SSDs 15-1 to 15-*n*. The RAID processor 163 outputs the generated divided data and redundant data to the SSDs 15-1 to 15-*n*.

The SSDs 15-1 to 15-*n* comprise storage media 151-1 to 151-*n*, respectively, and controllers 152-1 to 152-*n*, respectively. The SSDs 15-1 to 15-*n* operate similarly, and thus, the SSD 15 will be described below.

When supplied with a write instruction and divided data or redundant data by the RAID controller 16, the controller 152-1 writes the received divided data or redundant data to the storage medium 151-1. Furthermore, when supplied with a read instruction by the RAID controller 16, the controller 152-1 reads the divided data or redundant data from the storage medium 151-1 and outputs the read divided data or redundant data to the RAID controller 16.

Upon receiving an instruction to disable the reading function from the RAID controller 16, the controller 152-1 does not execute a reading process even if the controller 152-1 receives a read instruction from the RAID controller 16. Furthermore, upon receiving an instruction to enable the reading function from the RAID controller 16, the controller 152-1 executes a reading process in accordance with the read instruction from the RAID controller 16.

Additionally, the controller 152-1 performs wear leveling when writing data to the storage medium 151-1 or at a predetermined timing. The wear leveling is a process for distributing writing over a plurality of elements in the storage medium 151-1 as evenly as possible instead of concentrating the writing on one element in the storage medium 151-1. Upon receiving an instruction to disable the wear leveling function from the RAID controller 16, the controller 152-1 does not perform wear leveling. Furthermore, upon receiving an instruction to enable the wear leveling function from the RAID controller 16, the controller 152-1 performs wear leveling when writing data to the storage medium 151-1 or at a predetermined timing.

In accordance with a session establishment instruction from the main controller 17, the output buffer 12 forms a ring buffer corresponding to an access request. The output buffer 12 temporarily holds content data generated by the RAID controller 16 in the ring buffer, and distributes the content data to the communication terminal 30 having transmitted the access request.

Now, operations of the video distribution server 10 configured as described above will be described. In an example described below, six SSDs are installed in the video distribution server 10, and the RAID level is 6.

Figure 5:
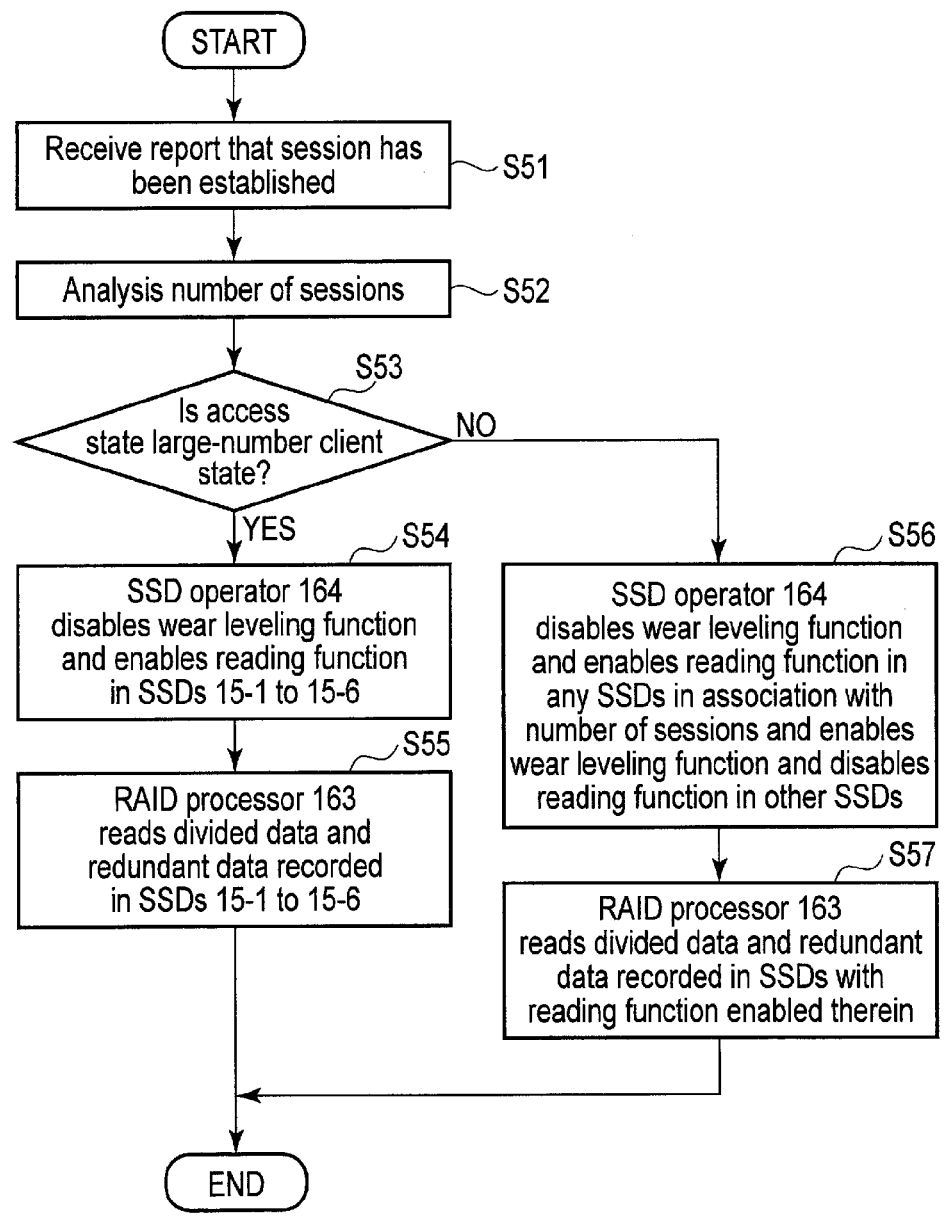
FIG. 5 is a flowchart showing an operation performed by the RAID controller shown in FIG. 2 in reading content data from the SSD.

FIG. 5 is a flowchart showing an operation performed by the RAID controller 16 according to the embodiment in reading content data from the SSDs 15-1 to 15-*n*.

First, the RAID controller 16 receives the report from the main controller 17 that a session has been established (step S51). The analysis unit 161 counts the number of sessions established and analyzes the number of sessions during a preset time (step S52).

Based on the result of the analysis in the analysis unit 161, the determination unit 162 determines whether or not the state of accesses at the current time is the large-number client state (step S53). In the description with reference to FIG. 5, a state with 4,000 sessions or more per hour is determined to be the "large-number client state", and a state with less than 4,000 sessions per hour is determined to be the "small-number client state".

If the access state is the large-number client state (Yes in step S53), the SSD operator 164 gives an instruction to disable the wear leveling function and to enable the reading function, to the controllers 152-1 to 152-6 mounted in the SSDs 15-1 to 15-6 (step S54). The RAID processor 163 reads the divided data and redundant data recorded in the SSDs 15-1 to 15-6 (step S55) to end the process. FIG. 6 is a schematic diagram showing that divided data and redundant data are read from the SSDs 15-1 to 15-6.

If the access state is the small-number client state (No in step S53), the SSD operator 164 gives an instruction to disable the leveling function and to enable the reading function for any of the SSDs in association with the number of sessions, and gives an instruction to enable the leveling function and to disable the reading function for the other SSDs (step S56). That is, when the number of sessions is between 1,500 and 3,999, the SSD operator 164 gives an instruction to disable the leveling function and to enable the reading function for the SSDs 15-1 to 15-5, and gives an instruction to enable the leveling function and to disable the reading function for the SSD 15-6. When the number of sessions is between 0 and 1,500, the SSD operator 164 gives an instruction to disable the leveling function and to enable the reading function for the SSDs 15-1 to 15-4, and gives an instruction to enable the leveling function and to disable the reading function for the SSD 15-5 and 15-6.

The RAID processor 163 reads the divided data and/or redundant data from the SSDs with the reading function enabled therein (step S57) to end the process. FIG. 7 is a schematic diagram showing that the divided data and/or redundant data are read from the SSDs 15-1 to 15-4 and that the wear leveling process is enabled in the SSDs 15-5 and 15-6.

Figure 8:
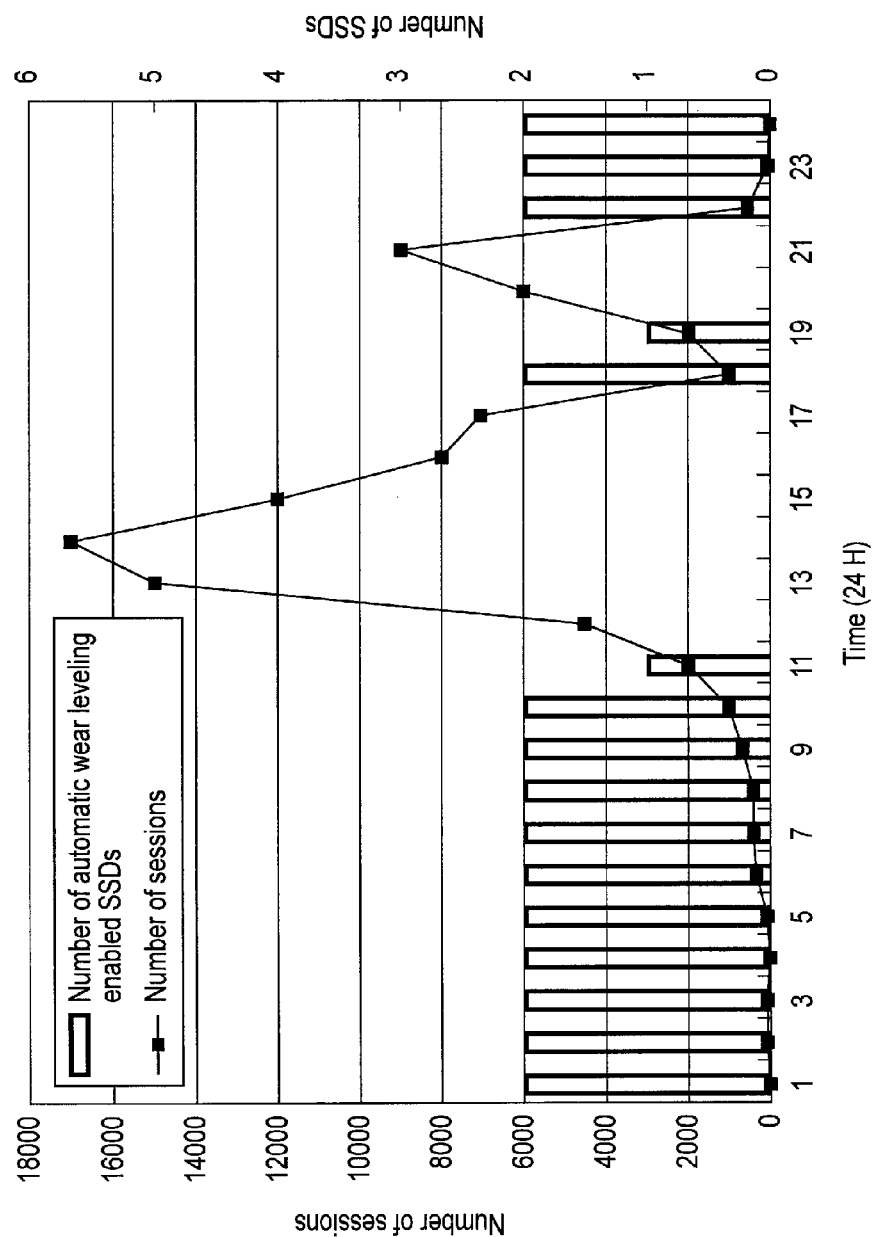
FIG. 8 is a diagram showing a number of SSDs on which a wear leveling process is executed, with respect to the number of sessions per hour.

FIG. 8 is a diagram showing an example of the number of SSDs on which a wear leveling process is executed, with respect to the number of sessions per hour. In FIG. 8, an x axis represents time, a left y axis represents the number of sessions, and a right y axis represents the number of SSDs on which automatic wear leveling is performed.

Figure 9:
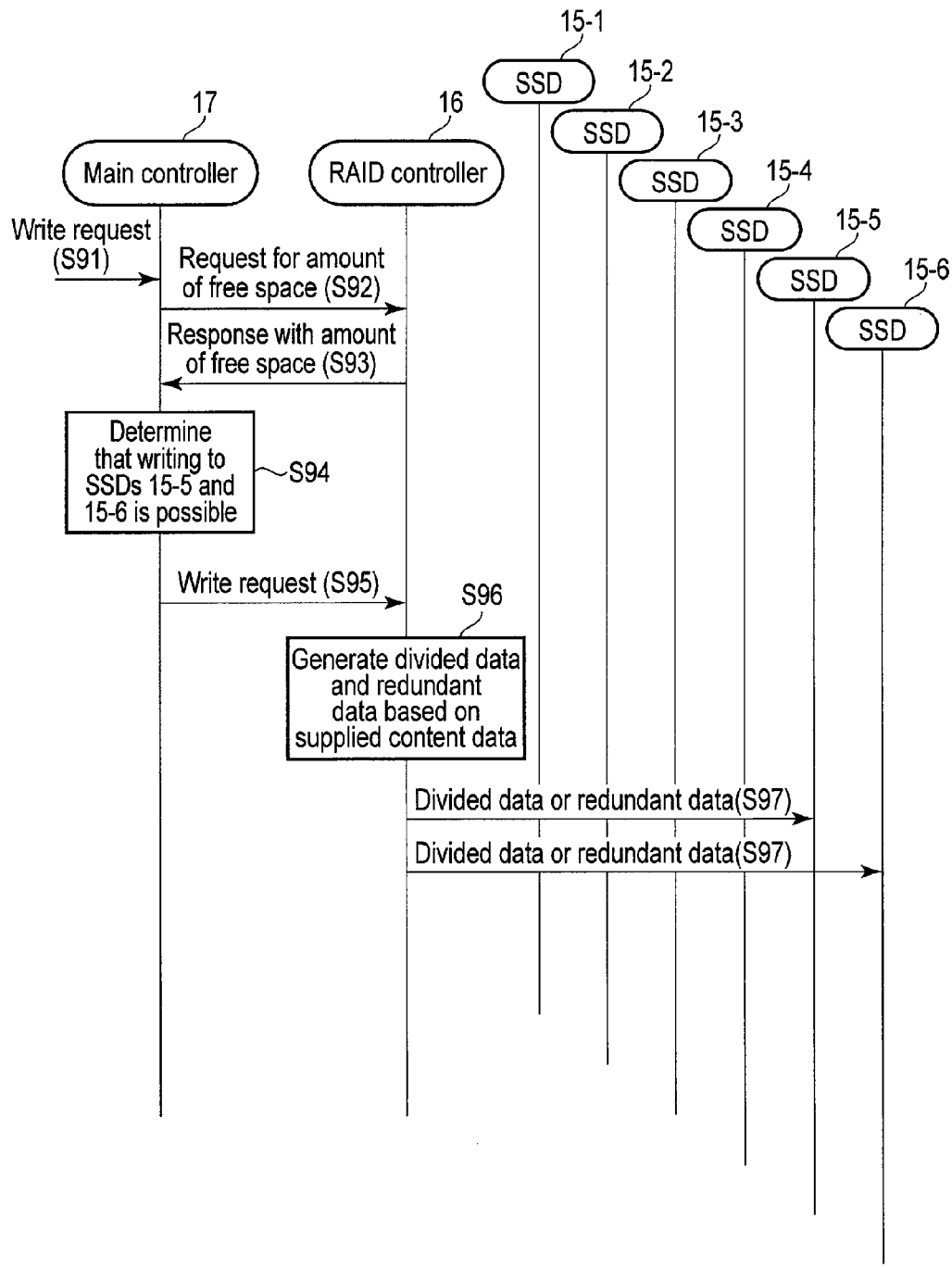
FIG. 9 is a sequence diagram showing an operation performed by the video distribution server shown in FIG. 2 in writing content data to SSDs for which a wear leveling function is enabled, whereas a reading function is disabled.

FIG. 9 is a sequence diagram showing operations performed in writing content data to those of the SSDs 15-1 to 15-*n* for which the wear leveling function is enabled, whereas the reading function is disabled. With reference to FIG. 9, a case will be described where, for the SSDs 15-1 to 15-4, the wear leveling function is disabled, whereas the reading function is enabled and where, for the SSDs 15-5 and 15-6, the wear leveling function is enabled, whereas the reading function is disabled.

First, the main controller 17 receives a write request from the operation terminal 20 (sequence S91). The main controller 17 requests the RAID controller 16 for the amount of free space in the SSDs 15-5 and 15-6 included in the SSDs 15-1 to 15-*n* and for which the wear leveling function is enabled, whereas the reading function is disabled (sequence S92).

The RAID controller 16 responds to the main controller 17 with the amount of free space in the SSDs 15-5 and 15-6 (sequence S93).

If the amount of free space in the SSDs 15-5 and 15-6 is larger than a predetermined amount, the main controller 17 determines that writing to the SSDs 15-5 and 15-6 is possible (sequence S94), and outputs a write request to the RAID controller 16 (sequence S95). Furthermore, if the amount of free space in the SSDs 15-5 and 15-6 is smaller than the predetermined amount, the main controller 17 determines that writing to the SSDs 15-5 and 15-6 is impossible, and outputs an error message to the operation terminal 20 via the interface unit 18.

In accordance with a write request from the main controller 17, the RAID controller 16 uses the RAID processor 163 to generate divided data and redundant data based on supplied content data (sequence S96). The RAID controller 16 outputs the generated divided data and redundant data to the SSDs 15-5 and 15-6 (sequence S97). The SSDs 15-5 and 15-6 writes the divided data and redundant data output by the RAID controller 16 to the storage media 151-5 and 151-6. FIG. 10 is a schematic diagram showing that divided data and/or redundant data are read from the SSDs 15-1 to 15-4, whereas divided data and redundant data are written to the SSDs 15-5 and 15-6.

FIG. 11 is a flowchart showing an operation performed by the RAID controller 16 according to the embodiment in the idle state. With reference to FIG. 11, a case will be described where divided data and redundant data are read from the SSDs 15-5 and 15-6, whereas newly generated divided data and redundant data are written to the SSDs 15-1 to 15-6.

First, the RAID controller 16 receives the report from the main controller 17 that the video distribution server 10 is in the idle state (step S111). The SSD operator 164 gives the SSDs 15-1 to 15-6 an instruction to enable the wear leveling function and to enable the reading function (step S112).

The RAID processor 163 reads the divided data and redundant data recorded in the SSDs 15-1 to 15-6 and records the divided data and redundant data in the RAM (step S113). At this time, the divided data and redundant data read from the SSDs 15-5 and 15-6 are provided with identification information indicating that the divided data and redundant data have been generated based on the same content data. With reference to the identification information, the RAID processor 163 generates content data based on the divided data and redundant data read from the SSDs 15-5 and 15-6 (step S114). Based on the generated content data, the RAID processor 163 generates divided data and redundant data to be written to the SSD 15-1 to 15-6 (step S115). The RAID processor 163 outputs the generated divided data and redundant data to the SSDs 15-1 to 15-6 to the SSDs (step S116) to end the process. FIG. 12 is a schematic diagram showing that content data generated based on divided data and redundant data read from the SSDs 15-5 and 15-6 is written to the SSDs 15-1 to 15-6. Once the process is complete, a common striping structure is constructed for the SSDs 15-1 to 15-6.

Figure 13:
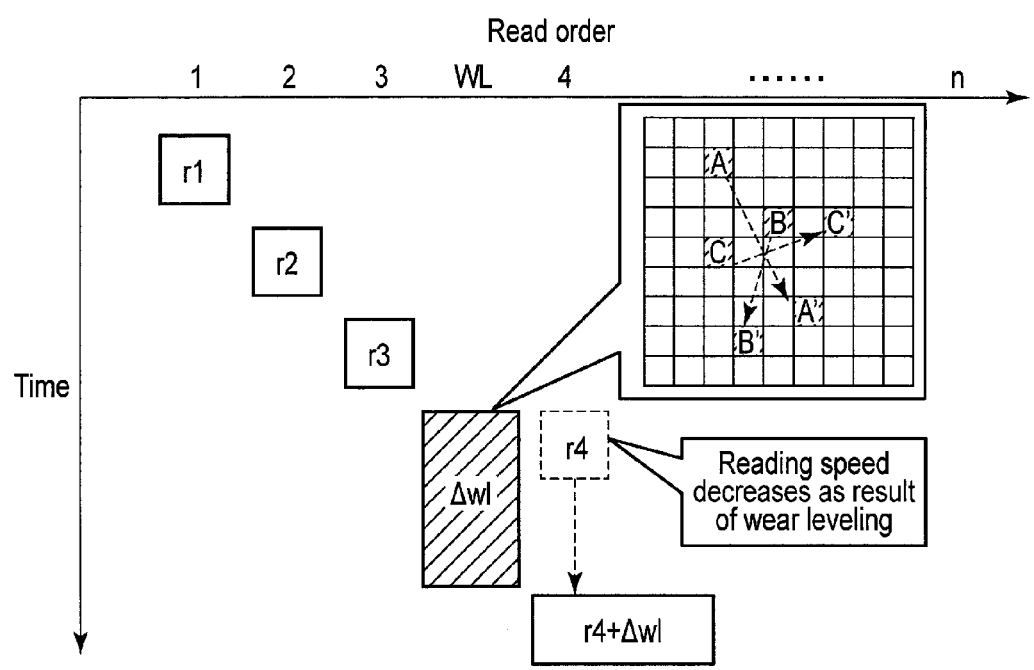
FIG. 13 is a diagram illustrating that the wear leveling process may cause a delay in a reading process.

As described above, in the embodiment, the RAID controller 16 is provided with the SSD operator 164 to enable the controllers 152-1 to 152-*n* mounted in the SSDs 15-1 to 15-*n* to stop the wear leveling function. When wear leveling is performed while content data are being read from the SSDs, a delay equivalent to the period for which the wear leveling process is executed occurs in the reading process as shown in FIG. 13. In FIG. 13, the x axis represents the order of reading and the y axis represents time. As shown in FIG. 13, wear leveling (w1) occurs between reading 3 and reading 4. In the conventional video distribution server, wear leveling is performed under the control of the controllers mounted in the SSDs and fails to be controlled by the main controller and the RAID controller. In the video distribution server 10 according to the embodiment, the SSD operator 164 can give the appropriate instruction to the SSDs 15-1 to 15-*n* to limit the implementation of wear leveling, enabling avoidance of the wear leveling process during data reading.

Furthermore, according to the embodiment, for a large number of sessions, the RAID controller 16 stops the wear leveling function for all of the SSDs 15-1 to 15-*n* and reads data from the SSDs 15-1 to 15-*n*. Additionally, for a small number of sessions, the RAID controller 16 stops the wear leveling function for some of the SSDs 15-1 to 15-*n* and reads data from the SSDs for which the wear leveling function has been stopped. This enables SSD resources to be efficiently utilized while avoiding performing wear leveling on read target SSDs.

Therefore, the video distribution server 10 according to the embodiment can prevent a delay in the reading process resulting from wear leveling even in an environment where the wear leveling may be performed during reading from the same SSD.

Furthermore, in the embodiment, the RAID processor 163 executes a data writing process on the SSDs for which the RAID processor 163 is instructed by the SSD operator 164 to enable the wear leveling function and to disable the reading function. This enables execution of data reading and writing on the same SSD to be avoided. Furthermore, during a period with a small number of sessions, data writing can be performed without delaying the reading process.

Additionally, in the embodiment, when the video distribution server 10 is in the idle state, the RAID configuration of content data recorded in at least one of the SSDs 15-1 to 15-*n* can be reconstructed in the SSDs 15-1 to 15-*n*. Thus, content data recorded in different numbers of SSDs in association with the number of sessions are reconstructed in the SSDs 15-1 to 15-*n*. This allows a stable redundant configuration to be maintained in the SSDs 15-1 to 15-*n*. In addition, since the video distribution server 10 records content data using the SSDs 15-1 to 15-*n*, the above-described processing can be repeatedly executed in accordance with the number of sessions when the idle state ends.

In the embodiment, the specific example with the RAID level 6 is described. However, the RAID level is not limited to 6. Another level may be used.

Furthermore, in the embodiment, the number of sessions per hour is acquired as an analysis result. However, the time interval is not limited to one hour. The time interval may be equal to or longer than one hour or equal to or shorter than one hour.

Additionally, in the embodiment, the case is described where the SSD operator 164 outputs, to the SSDs 15-1 to 15-*n*, an instruction to disable the wear leveling function and to enable the reading function and an instruction to enable the wear leveling function and to disable the reading function. However, the present invention is not limited to this. For example, the SSD operator 164 may output, to the SSDs 15-1 to 15-*n*, an instruction to disable the wear leveling function, disable the reading function, and disable the writing function and an instruction to enable the wear leveling function, disable the reading function, and enable the writing function. The writing function refers to a function provided by the controllers 152-1 to 152-*n* to write data to the storage media 151-1 to 151-*n* mounted in the SSDs 15-1 to 15-*n*, respectively. In this case, the main controller 17 requests the RAID controller 16 for the amount of free space in SSDs with the writing function enabled therein. Furthermore, upon receiving the report from the main controller 17 that the video distribution server 10 is in the idle state, the SSD operator 164 gives the controllers 152-1 to 152-*n* an instruction to enable the wear leveling function, enable the reading function, and enable the writing function While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video distribution server comprising:
   a plurality of Solid State Drive (SSD) each comprising:
   a storage medium configured to record a plurality of divided data into which content data is divided and redundant data intended to restore one of the plurality of divided data; and
   a controller configured to execute a wear leveling process on the storage medium; and
   a RAID (Redundant Arrays of Inexpensive Disks) controller configured:
   to acquire a number of sessions per preset period, a session being established between a communication terminal and the video distribution server, wherein the session starts when the video distribution server accepts a request from the communication terminal for accessing the video distribution server;
   to determine whether the number of sessions is larger than a preset reference value or not; and
   to give the controllers mounted in the plurality of SSDs an instruction to enable a wear leveling function providing the wear leveling process and to disable a reading function to read the divided data and/or the redundant data from the storage medium, or an instruction to disable the wear leveling function and to enable the reading function based on a result of the determination.

2. The video distribution server according to claim 1, wherein:
   the RAID controller gives the controllers mounted in the plurality of SSDs an instruction to disable the wear leveling function and to enable the reading function in case where the number of sessions is larger than the preset reference value;
   the RAID controller gives the controllers mounted in a certain number of the plurality of SSDs an instruction to disable the wear leveling function and to enable the reading function and gives the controllers mounted in the other SSDs of the plurality of SSDs an instruction to enable the wear leveling function and to disable the reading function in case where the number of sessions period is not larger than the preset reference value; and
   the RAID controller reads the divided data and/or redundant data from the storage medium in the SSD, the SSD included in the plurality of SSDs and for which the wear leveling function is disabled, whereas the reading function is enabled.

3. The video distribution server according to claim 2, wherein the RAID controller allows the SSD, upon receiving a write request, to write the divided data and/or redundant data to the storage medium in the SSD, the SSD included in the plurality of SSDs and for which the wear leveling function is enabled, whereas the reading function is disabled.

4. The video distribution server according to claim 3, further comprising a main controller configured to:
   request, upon receiving a write request, an amount of free space in the storage medium in the SSD, the SSD included in the plurality of SSDs and for which the wear leveling function is enabled, whereas the reading function is disabled; and
   cancel the write request in case where the amount of free space in a response to the write request is smaller than a preset amount.

5. The video distribution server according to claim 3, wherein, in an idle state, the RAID controller gives the controllers mounted in the plurality of SSDs an instruction to enable the wear leveling function and to enable the reading function, reads the written divided data and/or redundant data from the plurality of SSDs, generates content data based on the read divided data and/or redundant data, generates divided data and redundant data based on the generated content data, and allows the plurality of SSDs to write the newly generated divided data and redundant data to the storage media in the plurality of SSDs.

6. The video distribution server according to claim 2, wherein:
   the RAID controller gives an instruction to enable a writing function to write divided data and/or redundant data, to the controller mounted in the SSD, the SSD included in the plurality of SSDs and for which the wear leveling function is enabled, whereas the reading function is disabled; and
   the RAID controller allows the SSD, upon receiving a write request, to write divided data and/or redundant data to the storage media in the SSD, the SSD included in the plurality of SSDs and for which the writing function is enabled.

7. The video distribution server according to claim 6, further comprising a main controller configured to:
request, upon receiving a write request, an amount of free space in the storage medium in the SSD, the SSD included in the plurality of SSDs and for which the writing function is enabled; and
cancel the write request in case where the amount of free space in a response to the write request fails to reach a preset amount.

8. The video distribution server according to claim 6, wherein, in an idle state, the RAID controller gives the controllers mounted in the plurality of SSDs an instruction to enable the wear leveling function, to enable the reading function, and to enable the writing function,
reads the written divided data and/or redundant data from the plurality of SSDs, generates content data based on the read divided data and/or redundant data, generates divided data and redundant data based on the generated content data, and allows the plurality of SSDs to write the newly generated divided data and redundant data to the storage media in the plurality of SSDs.

9. An SSD control method used in a video distribution server comprising a plurality of Solid State Drives (SSDs) each comprising a storage medium and a controller configured to execute a wear leveling process on the storage medium,
wherein the plurality of SSDs store, in the respective storage media, a plurality of divided data into which content data is divided and redundant data intended to restore one of the plurality of divided data, and the method comprises:
acquiring a number of sessions per preset period, a session being established between a communication terminal and the video distribution server, wherein the session starts when the video distribution server accepts a request from the communication terminal for accessing the video distribution server;
determining whether the number of sessions is larger than a preset reference value or not;
giving the controllers mounted in the plurality of SSDs an instruction to enable a wear leveling function to execute the wear leveling process and to disable a reading function to read the divided data and/or redundant data from the storage medium, or an instruction to disable the wear leveling function and to enable the reading function based on a result of the determination.

10. The SSD control method according to claim 9, further comprising:
giving the controllers mounted in the plurality of SSDs an instruction to disable the wear leveling function and to enable the reading function in case where the number of sessions is larger than the preset reference value;
giving the controllers mounted in a certain number of the plurality of SSDs an instruction to disable the wear leveling function and to enable the reading function and giving the controllers mounted in the other SSDs of the plurality of SSDs an instruction to enable the wear leveling function and to disable the reading function in case where the number of sessions period is not larger than the preset reference value; and
reading the divided data and/or redundant data from the storage medium in the SSD, the SSD included in the plurality of SSDs and for which the wear leveling function is disabled, whereas the reading function is enabled.

11. The SSD control method according to claim 10, further comprising allowing the SSD, upon receiving a write request, to write the divided data and/or redundant data to the storage medium in the SSD, the SSD included in the plurality of SSDs and for which the wear leveling function is enabled, whereas the reading function is disabled.

12. The SSD control method according to claim 11, further comprising:
requesting, upon receiving the write request, an amount of free space in the storage medium in the SSD, the SSD included in the plurality of SSDs and for which the wear leveling function is enabled, whereas the reading function is disabled; and
canceling the write request in case where the amount of free space in a response to the write request is smaller than a preset amount.

13. The SSD control method according to claim 11, further comprising:
giving, in an idle state, the controllers mounted in the plurality of SSDs an instruction to enable the wear leveling function and to enable the reading function;
reading the written divided data and/or redundant data;
generating content data based on the read divided data and/or redundant data;
generating divided data and redundant data based on the generated content data; and
allowing the plurality of SSDs to write the newly generated divided data and redundant data to the storage media in the plurality of SSDs.

14. The SSD control method according to claim 10, further comprising
giving an instruction to enable a writing function to write divided data and/or redundant data, to the controllers mounted in the SSD, the SSD included in the plurality of SSDs and for which the wear leveling function is enabled, whereas the reading function is disabled, and
upon receiving a write request, allowing the SSD to write divided data and/or redundant data to the storage media in the SSD, the SSD included in the plurality of SSDs and for which the writing function is enabled.

15. The SSD control method according to claim 14, further comprising:
requesting, upon receiving a write request, an amount of free space in the storage medium in the SSD, the SSD included in the plurality of SSDs and for which the writing function is enabled; and
canceling the write request in case where the amount of free space in a response to the write request fails to reach a preset amount.

16. The SSD control method according to claim 14, further comprising
giving, in an idle state, the controllers mounted in the plurality of SSDs an instruction to enable the wear leveling function, to enable the reading function, and to enable the writing function;
reading the written divided data and/or redundant data;
generating content data based on the read divided data and/or redundant data;
generating divided data and redundant data based on the generated content data; and
allowing the plurality of SSDs to write the newly generated divided data and redundant data to the storage media in the plurality of SSDs.

* * * * *